(12) United States Patent
Kumar

(10) Patent No.: US 10,104,496 B2
(45) Date of Patent: Oct. 16, 2018

(54) TELEMATICS DEVICES AND SYSTEMS

(71) Applicant: Laird Technologies, Inc., Earth City, MO (US)

(72) Inventor: Pranav Kumar, Holly, MI (US)

(73) Assignee: LAIRD TECHNOLOGIES, INC., Earth City, MO (US)

( * ) Notice: Subject to any disclaimer, the term of this patent is extended or adjusted under 35 U.S.C. 154(b) by 74 days.

(21) Appl. No.: 15/200,374

(22) Filed: Jul. 1, 2016

(65) Prior Publication Data
US 2018/0007504 A1     Jan. 4, 2018

(51) Int. Cl.

| | |
|---|---|
| *G08B 21/00* | (2006.01) |
| *H04W 4/021* | (2018.01) |
| *H04W 4/02* | (2018.01) |
| *H04W 4/70* | (2018.01) |
| *H04W 4/80* | (2018.01) |
| *G08B 25/10* | (2006.01) |
| *G08B 25/00* | (2006.01) |
| *G08B 21/02* | (2006.01) |

(52) U.S. Cl.
CPC ........ *H04W 4/021* (2013.01); *G08B 21/0269* (2013.01); *G08B 21/0283* (2013.01); *G08B 25/009* (2013.01); *G08B 25/10* (2013.01); *H04W 4/027* (2013.01); *H04W 4/70* (2018.02); *H04W 4/80* (2018.02)

(58) Field of Classification Search
CPC ..... H04W 4/008; H04W 8/005; H04W 4/029; G08B 25/10; G08B 25/009; G08B 21/0269; G08B 21/0283; G08C 17/00; G06Q 10/0833; G01S 5/028; G06K 7/10376

USPC .... 340/539.22, 989, 539.13, 10.1, 3.1, 10.5; 701/35; 370/328.329; 455/41.2
See application file for complete search history.

(56) References Cited

U.S. PATENT DOCUMENTS

| | | | |
|---|---|---|---|
| 7,522,639 B1* | 4/2009 | Katz | G01D 4/002 340/870.02 |
| 7,707,076 B1* | 4/2010 | Whiteley | G06Q 10/087 340/10.1 |
| 9,558,602 B1* | 1/2017 | Straz | G07C 9/00007 |
| 2005/0068169 A1* | 3/2005 | Copley | G08B 21/0283 340/539.13 |

(Continued)

*Primary Examiner* — Hoi Lau
(74) *Attorney, Agent, or Firm* — Harness, Dickey & Pierce, P.L.C.; Anthony G. Fussner

(57) ABSTRACT

Exemplary embodiments are provided of telematics devices and exemplary corresponding methods. In an exemplary embodiment, a telematics device generally includes at least one hub device having a wireless network interface and a BLUETOOTH interface, and one or more peripheral devices. Each peripheral device includes a BLUETOOTH device in wireless communication with the hub device and/or at least one other peripheral device. Each of the one or more peripheral devices includes a peripheral device identifier and is configured to periodically broadcast peripheral device information including the peripheral device identifier to be received by the hub device. The hub device is configured to analyze received peripheral device information and transmit a report based on the analyzed peripheral device information to a remote station. Other exemplary embodiments include a camera interface for a telematics device, a smart lock assembly for a trailer, and a trailer tracking system.

19 Claims, 5 Drawing Sheets

(56) References Cited

U.S. PATENT DOCUMENTS

| | | | | |
|---|---|---|---|---|
| 2005/0275505 A1* | 12/2005 | Himmelstein | G10L 17/22 | 340/5.8 |
| 2005/0280546 A1* | 12/2005 | Ganley | G08B 13/1427 | 340/573.4 |
| 2006/0250235 A1* | 11/2006 | Astrin | G08B 25/009 | 340/539.22 |
| 2009/0040040 A1* | 2/2009 | Ben-Itzhak | G08B 13/1427 | 340/539.13 |
| 2009/0117848 A1* | 5/2009 | Nagata | H04W 8/005 | 455/41.2 |
| 2011/0148625 A1* | 6/2011 | Velusamy | G08B 13/1427 | 340/539.13 |
| 2013/0214909 A1* | 8/2013 | Meijers | H04W 4/008 | 340/10.5 |
| 2013/0293355 A1* | 11/2013 | Christopher | G06K 7/10376 | 340/10.1 |
| 2013/0300541 A1* | 11/2013 | Pesonen | G01S 5/0289 | 340/10.1 |
| 2014/0055243 A1* | 2/2014 | Kerai | G06Q 10/0833 | 340/10.1 |
| 2014/0097934 A1* | 4/2014 | Su | G08C 17/00 | 340/3.1 |
| 2014/0254466 A1* | 9/2014 | Wurster | H04L 12/189 | 370/312 |
| 2014/0347193 A1* | 11/2014 | Ljung | H04L 67/04 | 340/870.01 |
| 2015/0084769 A1* | 3/2015 | Messier | G08B 21/0261 | 340/539.13 |
| 2015/0130629 A1* | 5/2015 | Chen | H04Q 9/00 | 340/870.02 |
| 2015/0277387 A1* | 10/2015 | Hasegawa | G04G 9/00 | 368/239 |
| 2015/0356858 A1* | 12/2015 | Daoura | G06Q 10/00 | 340/539.32 |
| 2015/0356861 A1* | 12/2015 | Daoura | G08B 21/0269 | 340/539.13 |
| 2015/0356862 A1* | 12/2015 | Daoura | G08B 25/10 | 340/686.6 |
| 2016/0174022 A1* | 6/2016 | Nhu | H04W 4/008 | 455/41.2 |
| 2016/0174058 A1* | 6/2016 | Lindholm | H04W 8/005 | 370/329 |
| 2016/0210454 A1* | 7/2016 | Chou | G06F 21/32 | |
| 2016/0212147 A1* | 7/2016 | Palin | H04L 63/062 | |
| 2016/0212194 A1* | 7/2016 | Palin | G06F 3/0484 | |
| 2016/0227392 A1* | 8/2016 | Palin | H04W 8/005 | |
| 2016/0337787 A1* | 11/2016 | Palin | H04W 4/001 | |
| 2016/0345173 A1* | 11/2016 | Shirakawa | G06F 21/335 | |
| 2016/0373185 A1* | 12/2016 | Wentzloff | H04B 7/26 | |
| 2017/0034647 A1* | 2/2017 | Takeuchi | H04W 4/008 | |
| 2017/0041868 A1* | 2/2017 | Palin | H04L 5/0048 | |
| 2017/0052753 A1* | 2/2017 | Paolini, Jr. | G09G 3/344 | |
| 2017/0112716 A1* | 4/2017 | Rawls-Meehan | A61H 23/04 | |
| 2017/0187828 A1* | 6/2017 | Soji | H04L 67/325 | |
| 2017/0245285 A1* | 8/2017 | Palin | H04L 45/02 | |

* cited by examiner

TELEMATICS DEVICES AND SYSTEMS

FIELD

The present disclosure generally relates to telematics devices and systems.

BACKGROUND

This section provides background information related to the present disclosure which is not necessarily prior art.

Telematics devices (e.g., vehicle tracker devices, etc.) may be coupled to vehicles, assets, etc. to track location and other features of the vehicle, assets, etc. The tracker devices may include communication with a remote station. These devices may allow users to monitor vehicles, assets, etc.

SUMMARY

This section provides a general summary of the disclosure, and is not a comprehensive disclosure of its full scope or all of its features.

According to various aspects, exemplary embodiments are provided of telematics devices and exemplary corresponding methods. In an exemplary embodiment, a telematics device generally includes at least one hub device having a wireless network interface and a BLUETOOTH interface, and one or more peripheral devices. Each peripheral device includes a BLUETOOTH Smart device in wireless communication with the hub device and/or at least one other peripheral device. Each of the one or more peripheral devices includes a peripheral device identifier and is configured to periodically broadcast peripheral device information including the peripheral device identifier to be received by the hub device. The hub device is configured to analyze received peripheral device information and transmit a report based on the analyzed peripheral device information to a remote station.

According to additional aspects of the present disclosure, an exemplary telematics device generally includes a wireless network interface configured to transmit data from the telematics device to a remote station, a global positioning system (GPS) receiver configured to determine a location of the telematics device, and a camera interface adapted to couple to a camera to trigger the camera to obtain an image and to receive the obtained image from the camera. The telematics device is configured to trigger the camera to obtain an image when a specified event occurs, and to transmit an event alert and the obtained image to a remote station.

According to additional aspects of the present disclosure, an exemplary smart lock assembly for a trailer includes a locking mechanism, the locking mechanism having a locked state and an unlocked state, and a BLUETOOTH device coupled to the locking mechanism and including a BLUETOOTH wireless interface. The BLUETOOTH device is configured to monitor the state of the locking mechanism, transmit a monitored state of the locking mechanism to a remote telematics device via the BLUETOOTH wireless interface, and in response to detection that the lock has been unlocked and/or broken, transmit an alert to the remote telematics device via the BLUETOOTH wireless interface.

According to additional aspects of the present disclosure, a trailer tracking system includes a BLUETOOTH tracker adapted to be coupled to a trailer. The BLUETOOTH tracker includes a BLUETOOTH wireless interface, a wireless network interface configured to transmit data from the BLUETOOTH tracker to a remote station, and a global positioning system (GPS) receiver configured to determine a location of the BLUETOOTH tracker. The system also includes a telematics device adapted to be coupled to a vehicle for hauling the trailer. The telematics device includes a wireless network interface configured to transmit data from the telematics device to a remote station, and a BLUETOOTH wireless interface configured to wirelessly communicate with the BLUETOOTH wireless interface of the BLUETOOTH tracker. The BLUETOOTH tracker is configured to, when the BLUETOOTH tracker is not in wireless communication with the telematics device, activate the GPS receiver and wireless network interface of the BLUETOOTH tracker and transmit tracker information to the remote station; and, when the BLUETOOTH tracker is in wireless communication with the telematics device, deactivate the GPS receiver and wireless network interface of the BLUETOOTH tracker, whereby the telematics device transmits location information to the remote station.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventors herein have recognized that asset management (e.g., stationary assets, mobile assets such as containers, vehicles on a lot, etc.) can be performed by equipping objects to be tracked (e.g., assets, etc.) with telematics devices that may include a cellular modem, a GPS, etc. The device may periodically transmit GPS location of the asset using the modem. Peripheral sensors may be connected to the device through a wired or wireless (e.g., Wi-Fi, BLUETOOTH 2.1, ZigBee, etc.) connection. However, operational costs in such management systems may be high. Wired connections can create difficulty in setup for some applications. Some wireless technology also requires a constant power source and can create difficulty in setup for some applications.

The inventors have also recognized telematics devices may transmit an alert, report, etc. when a pre-configured event occurs. Sometimes, the alerts also contain accompanying data. However, fleet managers may be interested in receiving additional information beyond the accompanying data. The inventors have also realized that the trailer locks used in fleet trucks are usually manual locks opened with a physical key in possession of the drivers. This is a concern for "leakage" of goods being carried as well as damage to the goods, exchange of the goods, etc. In addition, drivers, fleet managers, etc. may not know when a burglar breaks into a trailer. The inventors have also recognized trailer tracking in fleet management may include attaching a self-contained tracker to a trailer or using a device running from trailer power, which is often in addition to a separate tracking/telematics device already present inside the truck.

Figure 1:
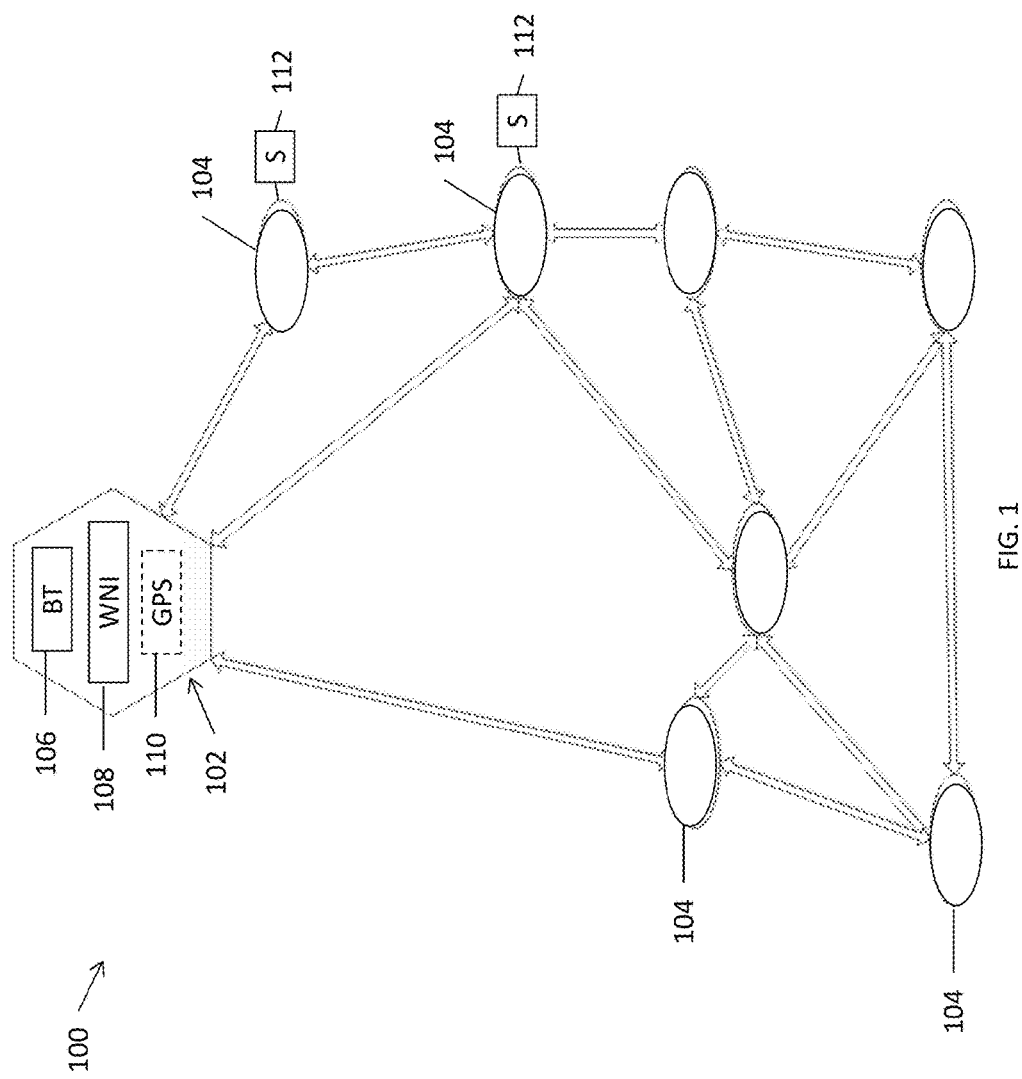
FIG. 1 is diagram of a mesh network asset management system for telematics devices according to an exemplary embodiment.

With reference now to the figures, FIG. 1 illustrates an exemplary embodiment of an asset management system 100 including at least one hub device 102. The hub device 102 includes a wireless network interface (WNI) 106 and a BLUETOOTH (BT) interface 108. The wireless network interface 106 can include any suitable wireless network interface capable of wireless communication with a remote station, including but not limited to a cellular antenna element, a Wi-Fi local area network (LAN) adapter, etc. A cellular antenna element may be any element suitable for sending and/or receiving cellular network signals (e.g., CDMA, GSM, 2G, 3G, 4G, LTE, etc.). The BLUETOOTH interface 108 can include any suitable interface capable of BLUETOOTH communication using any suitable BLUETOOTH protocol, including but not limited to BLUETOOTH Smart, BLUETOOTH Low Energy (BLE), BLUETOOTH 4.0, 4.1, 4.2, etc.

The system 100 also includes one or more peripheral devices 104 (e.g., tag devices, etc.). Each peripheral device 104 includes a small, self-contained, battery powered BLUETOOTH device (e.g., BLUETOOTH Smart, BLUETOOTH Low Energy (BLE), etc.) in wireless communication with the hub device 102 and/or at least one other peripheral device 104. Use of BLUETOOTH devices can allow for smaller, self-contained, battery powered devices due to the low energy consumption of BLUETOOTH devices, which may reduce cost in the system 100, increase ease of operation by allowing for a simpler deployment of peripheral devices 104 to assets, etc.

As shown in FIG. 1, the peripheral devices 104 are connected in mesh network where peripheral devices 104 can relay information from other peripheral devices 104 to the hub device 102. As long as the hub device 102 is placed within BLUETOOTH communication range of at least one peripheral device 104, the hub device 102 should be able to receive advertisements (e.g., peripheral device information, sensor data, etc.) from all peripheral devices 104 in the mesh network. The hub device 102 may be placed near a suitable power source for the hub device 102. The peripheral devices 104 may be placed with associated assets (e.g., placed in the assets, on the assets, with the assets, coupled to the assets, etc.) to monitor the assets. As should be apparent, other embodiments may include more or less peripheral devices 104, different interconnections of the peripheral devices 104, etc.

Each peripheral device 104 includes a peripheral device identifier and is configured to periodically broadcast peripheral device information (e.g., its characteristic information, etc.) including the peripheral device identifier to be received by the hub device 102. For example, each peripheral device 104 may periodically broadcasts its peripheral device information to the hub device 102 directly, through other peripheral device(s) 104 in the mesh network to the hub device 102, etc. The peripheral device 104 may broadcast a status-ID using advertisements (e.g., adverts, etc.) according to a BLUETOOTH protocol. The status-ID could, for example, include an "I am alive" packet, may consist of additional data items collected from sensors 112 coupled to the peripheral device 104, etc.

The peripheral device 104 may be remotely configurable to specify a peripheral device identifier, a time duration between periodic broadcasts of its peripheral device information, etc. For example, peripheral device identifiers for each peripheral device 104 may be specified, altered, etc. and may correspond to an asset associated with the peripheral device 104 (e.g., an asset the peripheral device is located with, located on, located in, etc.). The peripheral device identifiers may be specified remotely by a system monitor, via a mobile phone application over a BLUETOOTH communication protocol, the remote station, the hub device 102, etc. The time duration between periodic broadcast of peripheral device information may be specified at any suitable time duration (e.g., once every minute, once every hour, once every day, etc.). Alternatively, or in addition, broadcasts by the peripheral devices 104 may be event based, such as when a sensor 112 goes beyond a threshold (e.g., the peripheral device 104 broadcasts peripheral device information when a sensed temperature exceeds a threshold, etc.).

The hub device 102 is configured to analyze received peripheral device information and transmit a report based on the analyzed peripheral device information to a remote station (e.g., server, computer, smartphone, monitoring office, mobile device, etc.). For example, the hub device 102 can collect status-ID reports every configurable time period, and then perform an analysis of the received data. The hub device 102 may determine which peripheral devices 104 are present in the system 100, determine statuses of the peripheral devices 104, etc. based on the received peripheral device information from the peripheral devices 104. The hub device 102 can combine the information into a report and transmit the report to a remote station to provide monitoring, asset tracking, etc. to the remote station. Each peripheral device 104 may be associated with an asset, and the report may provide information on which assets are present in the system 100.

Sometimes, the hub device 102 may receive peripheral device information from only a subset of the total peripheral devices 104. For example, the hub device 102 could be configured with peripheral device identifiers of only a subset of the peripheral devices 104 such that the hub device 102 only monitors the subset of peripheral devices 104. The hub device 102 may be configured to only receive peripheral device information from the specified peripheral devices 104, and to transmit the report to the remote station based on analysis of only peripheral device information received from the subset of the total peripheral devices 104.

As mentioned above, the system 100 includes peripheral devices 104 connected in a mesh-network topology, such that each peripheral device 104 may be in wireless communication (e.g., using a BLUETOOTH protocol, etc.) with other peripheral devices 104. Accordingly, each peripheral device 104 may be configured to receive peripheral device information from one or more other peripheral devices 104. Each peripheral device 104 can relay received peripheral device information from other peripheral devices 104 to the hub device 102, to another peripheral device 104, etc. such that peripheral device information from all peripheral devices 104 may be received at the hub device 102.

In some embodiments, a peripheral device 104 may be coupled to at least one sensor 112 to obtain data from the sensor 112. For example, a sensor 112 may be configured to sense a parameter corresponding to an asset associated with the peripheral device 104. Accordingly, the peripheral device 104 may broadcast peripheral device information that includes data obtained from the sensor 112. The sensor(s) 112 may be any suitable sensors for detecting parameters of an asset, including but not limited to, temperature and/or humidity sensors with a BLE chip used in a freezer truck.

The hub device 102 may determine whether alert conditions exist based on received peripheral device information. For example, the hub device 102 may have stored peripheral device information trigger value(s) such that when peripheral device information is received from a peripheral device 104 that corresponds to the trigger value(s), an alert condition is indicated. The hub device 102 may be configured to transmit a report to the remote station whenever an alert condition is detected.

The hub device 102 may be configured to transmit a report to the remote station whenever received peripheral device information is indicative of an absence of one or more peripheral devices 104. For example, hub device 102 may store information about all peripheral devices 104 present in the system 100 and determine when a peripheral device 104 (and its associated asset) leaves the system.

The hub device 102 may be configured to send status reports to the remote station on a periodic basis (e.g., hourly, daily, weekly, etc.) as desired by a monitor of the system 100, thereby allowing a monitor to receive periodic information about the assets in the system 100.

In some embodiments, the hub device 102 optionally includes a global positioning system (GPS) receiver 110. For example, a GPS patch antenna may be configured to detect GPS signals for determining a location of the hub device 102, and therefore a location of the peripheral devices 104 in communication with the hub device 102. Other embodiments may include any suitable global navigation satellite system (GNSS) receiver(s) (e.g., global positioning system (GPS), European Galileo system, the Russian GLONASS, the Chinese Beidou navigation system, the Indian IRNSS, etc.).

The hub device 102 may include location information in the report transmitted to the remote station, thereby allowing for monitoring of the location of the assets associated with the peripheral devices 104 identified in the report. In some embodiments, the system 100 may be a moving asset management system (e.g., a fleet management system, including but not limited to a ship having containers, etc.). Alternatively, the system 100 may be a stationary asset management system (e.g., cars on a dealership lot, etc.). Moving systems 100 may receive greater benefit from a GPS receiver 110 in the hub device 102 to determine a location of the system 100 and its assets, but a stationary system 100 could also include a GPS receiver 110 in the hub device 102. For example, multiple peripheral devices 104 may be located inside a trailer at several locations with the peripheral devices 104 connected to the central hub device 102. These types of sensors may be used in any suitable commercial cold storage applications, etc. Containers inside a ship may include peripheral devices 104 connected in a mesh network. Expensive, valuable, etc. boxes in a trailer can have individual peripheral devices connected to a hub device 102 to periodically identify their presence in the trailer. Cars in a dealership parking lot may have peripheral devices 104 that periodically report their presence to a hub device 102.

Figure 2:
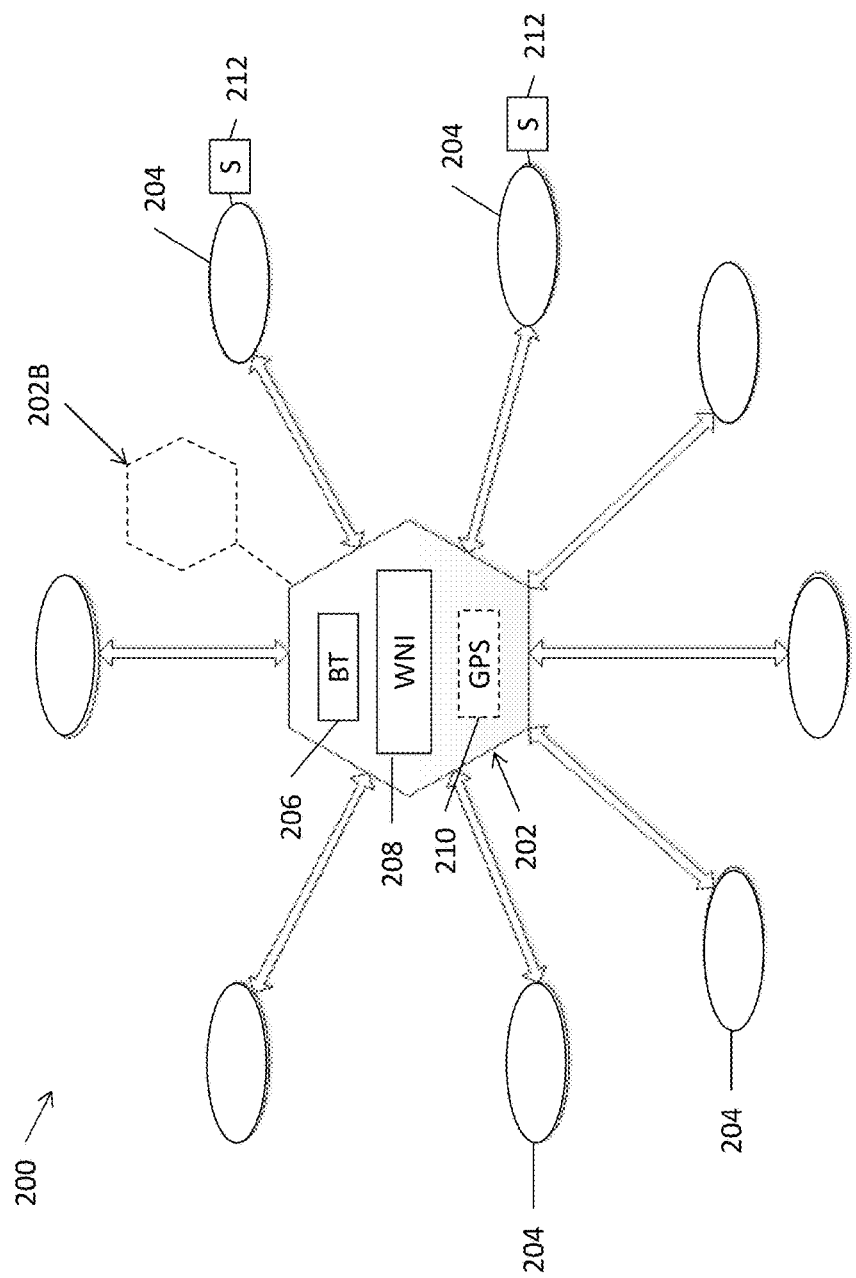
FIG. 2 is diagram of a star network asset management system for telematics devices according to another exemplary embodiment.

FIG. 2 illustrates an asset management 200 that is system similar to FIG. 1, but the asset management system 200 of FIG. 2 is arranged in a star network topology. Accordingly, the hub device 202 is positioned within a BLUETOOTH communication range of all of the peripheral devices 204 in the star-network topology. The hub device 202 is configured to receive peripheral device information broadcasts from the peripheral devices 204 directly. The star network topology may allow for a high number of peripheral devices 204 to connect to the hub device 202 because a dedicated connection may not be required.

Similar to the hub device 102 of FIG. 1, the hub device 202 of FIG. 2 includes a wireless network interface (WNI) 206 and a BLUETOOTH (BT) interface 208. The hub device 202 optionally includes a GPS receiver 210. Each peripheral device 204 may be coupled to one or more sensors 212 to provide sensor data to the hub device 202. Similar to the system 100 of FIG. 1, the system 200 of FIG. 2 may be a moving system, a stationary system, etc.

In some embodiments, the system 200 may include multiple hub devices. For example, FIG. 2 illustrates an optional additional hub device 202B. In these embodiments, one of the multiple hub devices can be an intermediate hub device (e.g., hub device 202B, etc.) configured to receive a report, data, peripheral device information, etc. from another hub device (e.g., from hub device 202, etc.). The intermediate hub device 202B can then transmit the received report, data, peripheral device information, etc. to a remote station. Multiple hub devices can connect in any suitable intermediate hub, central hub, etc. arrangement to create a connected star-topology where hub devices can relay information between one another while one of the hub devices sends reports to a remote station.

Figure 3:
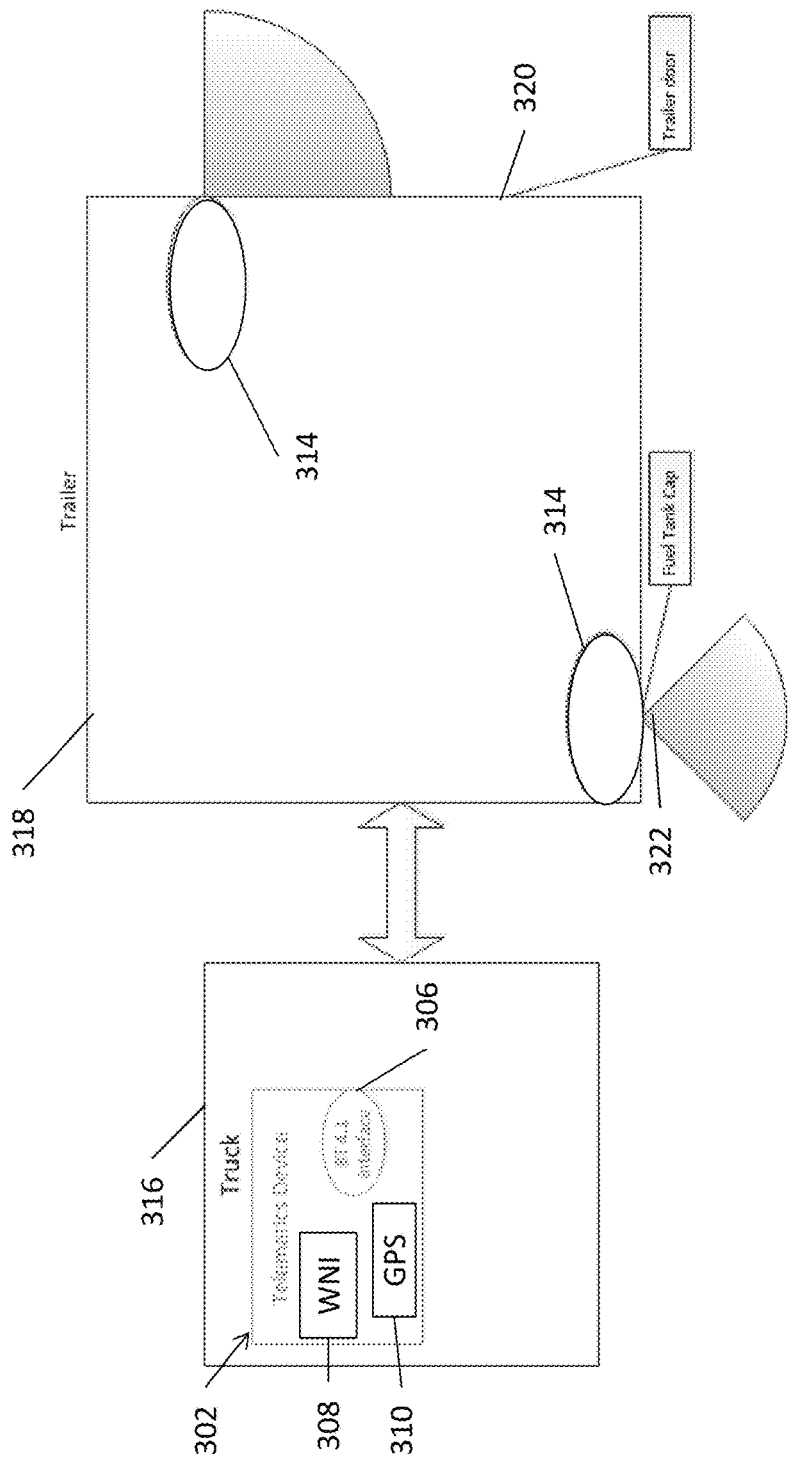
FIG. 3 is a block diagram of a telematics device having a camera interface for event-driven image capture according to another exemplary embodiment.

Referring now to FIG. 3, according to another exemplary embodiment a telematics device 302 for a vehicle includes a wireless network interface (WNI) 308 configured to transmit data from the telematics device 302 to a remote station. The telematics device 302 also includes a global positioning system (GPS) receiver 310 configured to determine a location of the telematics device 302.

The telematics device 302 also includes a camera interface 306 adapted to couple to a camera 314. For example, the camera interface 306 may include a BLUETOOTH wireless connection interface. The camera interface 306 is connected to trigger the camera 314 to obtain an image, and to receive the obtained image from the camera 314. The camera 314 may be any suitable camera, including but not limited to a BLUETOOTH low energy (BLE) enable camera.

The telematics device 302 is configured to trigger the camera 314 to obtain an image when a specified event occurs (e.g., by sending a BLUETOOTH signal to the camera 314, etc.). The telematics device 302 is also configured to transmit an event alert and the obtained image to a remote station (e.g., via the wireless network interface 308).

Although FIG. 3 illustrates the telematics device 302 positioned in a truck/cab 316 and the cameras 314 positioned in a trailer 318 coupled to the truck 316, it should be apparent that any suitable vehicle and camera implementations may be used. For example, the camera 314 may be an original equipment manufacturer (OEM) camera of a vehicle, such as a roof-top antenna camera of the vehicle (e.g., mounted roof-top camera, etc.). In those embodiments, the camera interface 306 may be coupled to the OEM camera interface. Although FIG. 3 illustrates two cameras 314, other embodiments may include more or less than two cameras 314.

In some embodiments, the telematics device 302 may be configured to compress the obtained image from the camera 314 before transmitting the obtained image to the remote station. This may reduce the bandwidth required to transmit the image, thereby increasing speed of transfer, staying within maximum transferable file size, etc.

The specified event for triggering the camera 314 to obtain an image (e.g., capture a picture, etc.) can be any suitable event. For example, the telematics device 302 may include an accelerometer adapted to detect an acceleration or deceleration of the telematics device 302. If the detected deceleration exceeds a specified threshold, a collision of the vehicle may be detected and the camera 314 may be triggered to obtain an image. Accordingly, a monitor may be able to record images at the time of the collision to assist in determining fault for the collision, detect who caused the collision (e.g., while a user is away from the vehicle, etc.).

The telematics device 302 may include a connector for coupling to the vehicle to obtain information about the vehicle (e.g., via an on-board diagnostics (OBD-II) connection, a CAN connection to the vehicle bus, etc.). Accordingly, the telematics device 302 may detect collisions based on diagnostic sensors of the vehicle. As should be apparent, the telematics device 302 may detect collisions from any direction.

The specified event may include a detection of a towing of the vehicle. For example, if the GPS receiver 310, accelerometer, etc. detects motion of the vehicle while the engine is turned off, a towing event may be detected and the camera 314 may be triggered to obtain image(s). This may allow a monitor to confirm the vehicle is being towed, observe what company is towing the vehicle, etc.

The specified event may include detection of an unlocking of a trailer lock of a trailer 318 of the vehicle. For example, the telematics device 302 may be configured to receive information from a trailer lock, trailer lock sensor, trailer door sensor, etc. indicative of when the trailer lock and/or trailer door 320 is being opened. A camera 314 may be positioned at a top of the trailer, back side of the trailer, etc. to capture picture(s) of the person opening the trailer lock and/or trailer door 320.

The trailer 318 may include a trailer fuel cap 322 and a camera 314 positioned near the fuel cap, on top of the trailer over the fuel cap, etc. The telematics device 302 may be configured to detect an opening of the fuel cap 322 (e.g., via a fuel cap sensor, the OBD-II connection, etc.) and to trigger the camera 314 to obtain image(s). This may allow a monitor to observe who is opening the fuel cap 322, whether someone is trying to steal fuel from the fuel tank, etc.

In some embodiments, the telematics device 302 may be configured to be remotely activated to obtain images from the camera 314 and transmit the obtained images to the remote station (e.g., server, mobile device, etc.). For example, a monitoring user may wish to view a current state of the vehicle and may activate the telematics device 302 (e.g., via a mobile device, a server, etc.) to trigger the camera 314 to capture an image and transmit the image to the remote station (e.g., the mobile device, the server, etc.). Accordingly, the monitoring user can monitor image status of the vehicle as desired (e.g., to perform an audit, etc.).

Figure 4:
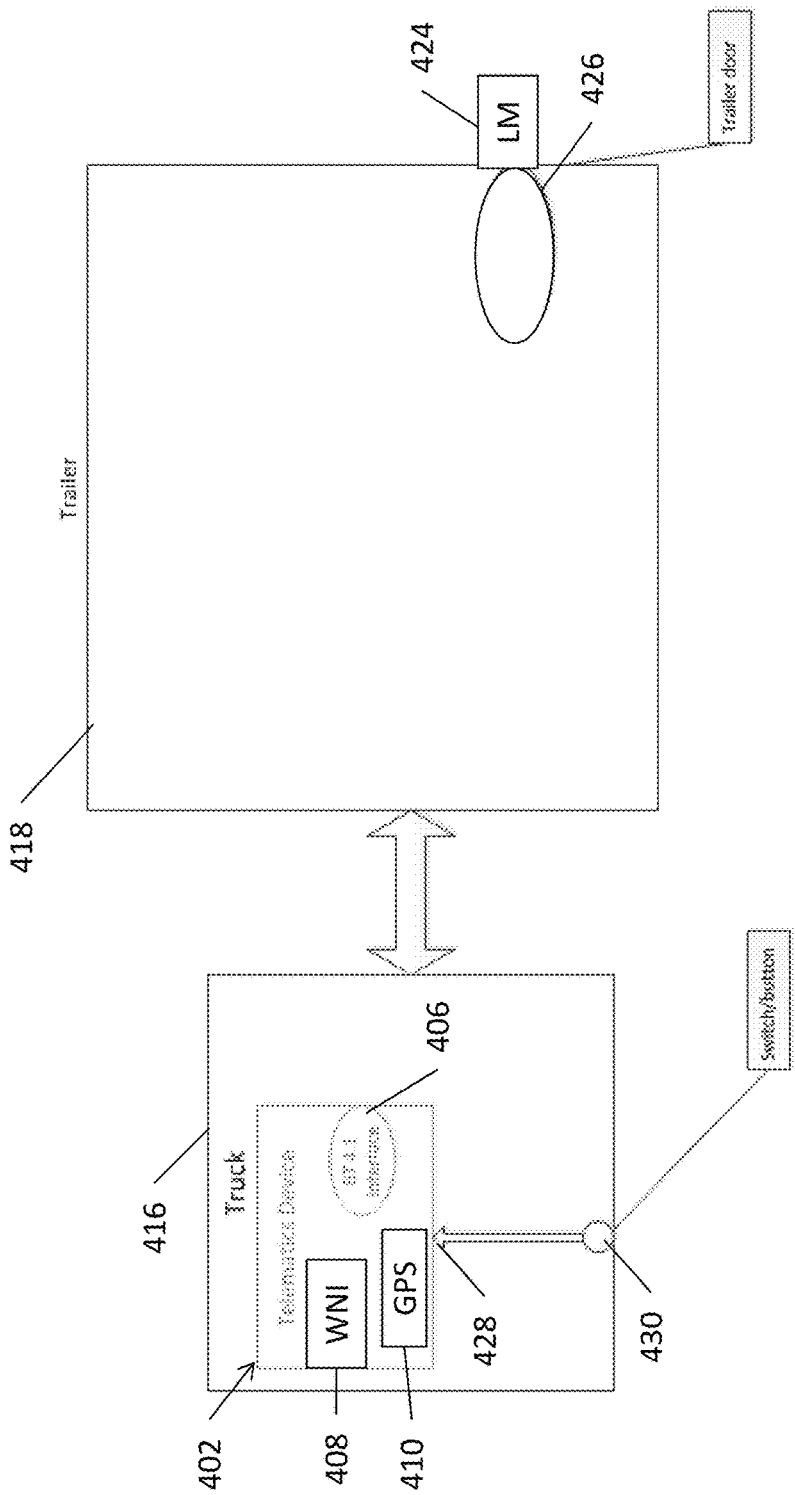
FIG. 4 is a block diagram of a smart lock assembly according to another exemplary embodiment.

FIG. 4 illustrates a smart lock assembly for a trailer according to another exemplary embodiment. The smart lock assembly includes a locking mechanism 424. The locking mechanism 424 includes a locked state and an unlocked state. The smart lock assembly also includes a BLUETOOTH device 426 (e.g., BLUETOOTH Smart, BLUETOOTH low energy, etc.) coupled to the locking mechanism 424 and including a BLUETOOTH wireless interface.

The BLUETOOTH device 426 is configured to monitor the state of the locking mechanism 424 and transmit a monitored state of the locking mechanism 424 to a remote telematics device 402 via the BLUETOOTH wireless interface 406. In response to detection that the locking mechanism 424 has been broken, the BLUETOOTH device 426 is configured to transmit an alert to the remote telematics device 402 via the BLUETOOTH wireless interface 406 of the BLUETOOTH device 426. Accordingly, the smart lock assembly can detect breaking of the locking mechanism 424 and alert a monitor when the locking mechanism 424 has been broken. This may allow a faster response to the breaking of the locking mechanism 424, assist in inhibiting theft of items secured by the locking mechanism 424, assist in faster recovery of items stolen after breaking of the locking mechanism 424, etc.

The telematics device 402 may be configured to obtain the monitored state of the locking mechanism 424 from the BLUETOOTH device 426 via the BLUETOOTH wireless interface 406 of the telematics device 402. The telematics device 402 may be configured to transmit the obtained state of the locking mechanism 424 to a remote station.

In some embodiments, the BLUETOOTH device 426 may be configured to unlock and/or lock the locking mechanism 424 in response to commands received from the remote telematics device 402. For example, the remote telematics device 402 may include a BLUETOOTH interface 406 in communication with the BLUETOOTH device 426. The telematics device 402 may send commands to the BLUETOOTH device 426 to lock and/or unlock the locking mechanism 424. The remote telematics device 402 may be activated to send lock and/or unlock commands from a driver of the vehicle, a remote monitor, etc. For example, the telematics device 402 may include a wireless network interface (WNI) 408 for sending information to a remote station (e.g., alerts that the locking mechanism 424 has been broken, alerts that the driver has issued a lock and/or unlock command, etc.), for receiving commands from a remote station (e.g., lock and/or unlock commands, etc.), etc.

In some embodiments, the telematics device 402 may include a general purpose input pin 428 connected to a switch 430. The telematics device 402 may be configured to transmit a lock and/or unlock command to the smart lock assembly via the BLUETOOTH wireless interface 406 of the telematics device 402 when a switch input (e.g., pressing of the switch 430, etc.) is detected at the general purpose input pin 428. Accordingly, a driver, user, etc. may press a button in the truck 416 to activate the telematics device 402 to lock and/or unlock the locking mechanism 424. In some embodiments, the telematics device 402 may be activated to lock and/or unlock the locking mechanism 424 via commands received at the BLUETOOTH interface 406 of the telematics device 402.

The locking mechanism 424 may be any suitable locking mechanism capable of having a locked state and an unlocked state. For example, the locking mechanism 424 may include an electronic switch, lever, pin, actuator, etc. In some embodiments, the locking mechanism 424 may not require use of a physical key to lock and unlock the locking mechanism 424. The electronic locking mechanism allows for notification if the locking mechanism is broken.

In some embodiments, a camera may be coupled to the telematics device 402 via a wired connection, a wireless interface (e.g., the BLUETOOTH interface 406, etc.), etc. The telematics device 402 may be configured to trigger the camera to obtain an image when the locking mechanism 424 is detected as opened, unlocked, and/or broken, and transmit the obtained image to the remote station. Accordingly, a monitor can observe who is at the trailer 418 when the locking mechanism 424 is broken, unlocked, and/or opened to assist in inhibiting theft of items in the trailer 418.

The telematics device 402 may also include a GPS receiver 410. The smart lock assembly may be used in a moving asset management system (e.g. fleet management) or a stationary asset management system. The GPS receiver 410 can provide additional information about the location of the telematics device 402 and the associated smart lock assembly to indicate a location of the breaking of the locking mechanism 424, thereby assisting in inhibiting "leakage" of goods in the trailer 418.

Figure 5:
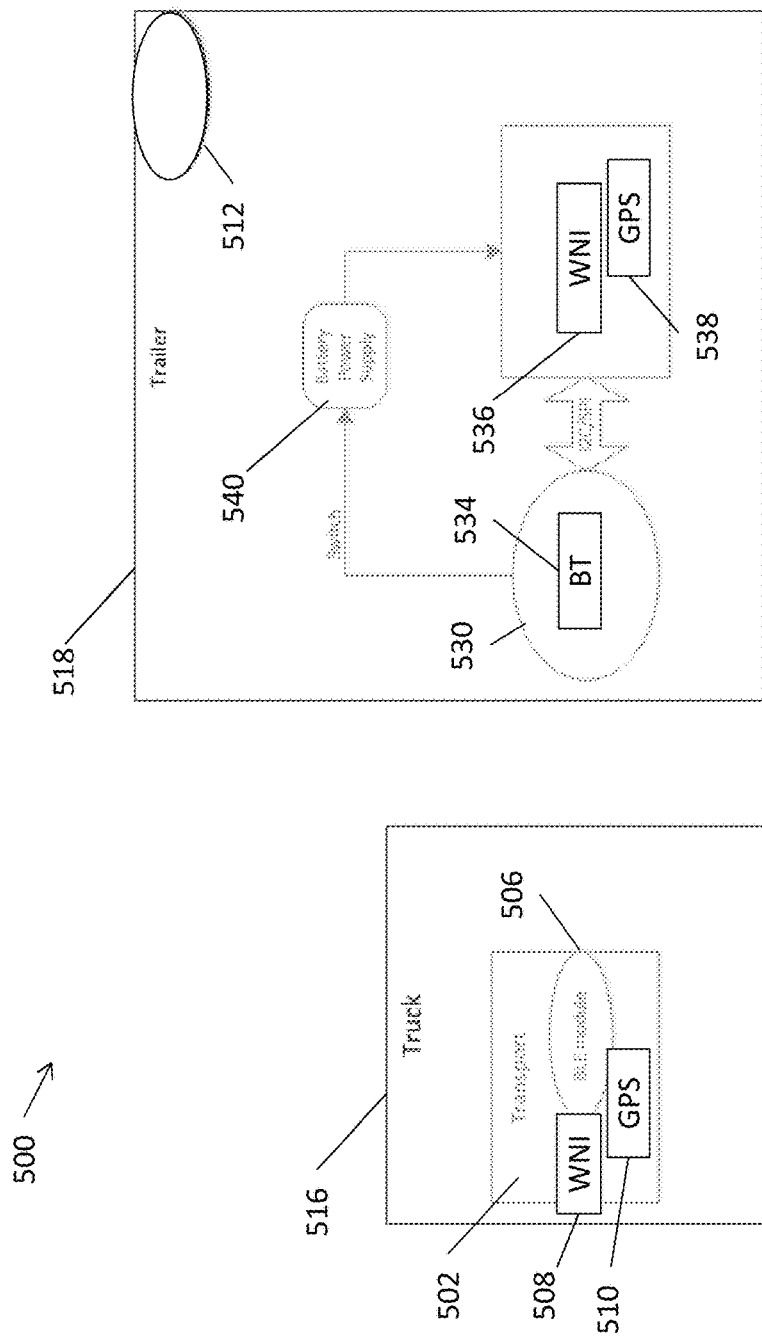
FIG. 5 is s a block diagram of a smart trailer tracker assembly according to another exemplary embodiment.

According to another exemplary embodiment illustrated in FIG. 5, a trailer tracking system 500 includes a BLUETOOTH tracker 530 (e.g., BLUETOOTH Smart device, etc.) adapted to be coupled to a trailer 518. The BLUETOOTH tracker 530 includes a BLUETOOTH (BT) wireless interface 534, a wireless network interface (WNI) 536 configured to transmit data from the BLUETOOTH tracker 530 to a remote station, and a global positioning system (GPS) receiver 538 configured to determine a location of the BLUETOOTH tracker 530.

The system 500 also includes a telematics device 502 adapted to be coupled to a vehicle (e.g., truck 516, etc.) for hauling the trailer 518. The telematics device 502 includes a wireless network interface 508 configured to transmit data from the telematics device 502 to a remote station, and a BLUETOOTH wireless interface 506 configured to wirelessly communicate with the BLUETOOTH wireless interface 534 of the BLUETOOTH tracker 530. The telematics device may optionally include a GPS receiver 510.

The BLUETOOTH tracker 530 is configured to, when the BLUETOOTH tracker 530 is not in wireless communication with the telematics device 502, activate the GPS receiver 538 and wireless network interface 536 of the BLUETOOTH tracker 530 to transmit tracker information to the remote station. This allows the BLUETOOTH tracker 530 to directly send information to the remote station when there is not a telematics device in communication with the BLUETOOTH tracker 530 that can relay information from the BLUETOOTH tracker 530 to the remote station.

When the BLUETOOTH tracker 530 is in wireless communication with the telematics device 502, the BLUETOOTH tracker 530 is configured to deactivate the GPS receiver 538 and wireless network interface 536 of the BLUETOOTH tracker 530. Instead, the BLUETOOTH tracker 530 transmits information to the telematics device 502 via the BLUETOOTH interface 506 of the telematics device 502, and the telematics device 502 relays the information to the remote station. This allows the BLUETOOTH tracker 530 to save power, cost associated with cellular data, etc. by having the telematics send information to the remote station instead. For example, the BLUETOOTH tracker 530 may turn off the GPS receiver 538 and wireless network interface 536 of the BLUETOOTH tracker 530 to save power, cost, etc. when the BLUETOOTH tracker 530 is in communication with the telematics device 502. Accordingly, the BLUETOOTH tracker 530 is configured to send information to the remote station directly when no telematics device is detected, but to save power, cost, etc. by using the telematics device 502 to transmit information to the remote station when the telematics device 502 is in communication with the BLUETOOTH tracker 530.

The wireless network interface 536 may receive power from a battery power supply 540. The BLUETOOTH tracker 530 may turn off the battery power supply 540 to cut off power to the wireless network interface 536 when the telematics device 502 is in range (e.g., when the truck/cab 516 comes in range of the trailer 518, etc.). The BLUETOOTH tracker 530 may send a notification to the wireless network interface 536 via I2C/SPI/UART communication protocol(s) to alert the wireless network interface 536 that it is going to cut off power to the wireless network interface 536. The BLUETOOTH tracker 530 may wait for an acknowledgement from the wireless network interface 536 before turning off the battery power supply 540. The wireless network interface 536 may be part of a group subscription plan and turning off the wireless network interface 536 may reduce cost of the subscription plan through reduced data usage. In some embodiments, the BLUETOOTH wireless interface 534 may be incorporated into the wireless network interface 536, such that the BLUETOOTH wireless interface 534 may be connected to a central processing unit (CPU), etc.

In some embodiments, the BLUETOOTH tracker 530 and telematics device 502 are configured to establish and maintain wireless communication with one another when the telematics device 502 is within BLUETOOTH communication range of the BLUETOOTH tracker 530. The telematics device 502 and/or BLUETOOTH tracker 530 may be capable of detecting when the other device is within BLUETOOTH communication range, and may maintain the wireless connection as long as they are in range to save power of the BLUETOOTH tracker 530.

In some embodiments, the BLUETOOTH tracker 530 may be coupled to one or more sensors 512. The BLUETOOTH tracker 530 may be configured to transmit obtained sensor data to the telematics device 502 when the telematics device 502 is in wireless communication with the BLUETOOTH tracker 530, such that the telematics device 502 can transmit the received sensor data to a remote station. The sensor(s) 512 can be any suitable sensors, including but not limited to a temperature sensor adapted to sense a temperature inside the trailer 518, a humidity sensor adapted to sense a humidity inside the trailer 518, etc.

As described herein, telematics devices, BLUETOOTH devices, sensors, etc. may be configured using any suitable hardware and/or software configurations. For example, the devices may include a microcontroller, microprocessor, digital signal processor, etc. having computer-executable instructions adapted to cause the device to perform the described operations when executed by the processors, controllers, etc. The devices may include suitable circuitry, logic gates, etc. to perform the described operations. The devices may include memory (e.g., flash memory, etc.) for storing computer-executable instructions, data, etc.

The exemplary telematics devices and systems described herein may provide one or more advantageous features as further described below. Some exemplary embodiments may provide reduced cost via energy efficient BLUETOOTH devices that can be self-contained and battery powered, provide easier operational cost through simplicity of deploying BLUETOOTH peripheral devices (e.g., tags, etc.) to assets, provide image capture for specified events (e.g., collisions, towing, etc.) occurring at a vehicle, reduce goods leakage or burglary, provide direct control of a trailer lock to a fleet manager, provide updates to a fleet manager for lock breaking events, reducing power consumption of a trailer tracker, increasing efficiency of data bandwidth usage, provide longer service life for devices through lower power consumption, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific numerical dimensions and values, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An asset management system comprising:
at least one hub device, the hub device including a wireless network interface and a short-range wireless communication interface; and
one or more peripheral devices, each peripheral device including a short-range wireless communication device in wireless communication with the hub device and/or at least one other of the peripheral devices;
wherein each of the one or more peripheral devices includes a peripheral device identifier and is configured to periodically broadcast peripheral device information including the peripheral device identifier to be received by the hub device;

wherein the hub device is configured to analyze received peripheral device information and transmit a report based on the analyzed peripheral device information to a remote station;

wherein each peripheral device is remotely configurable to specify the peripheral device identifier of the peripheral device and a time interval between periodic broadcasts of peripheral device information by the peripheral device;

wherein:
the one or more peripheral devices include multiple peripheral devices connected in a mesh-network topology; and
each of the multiple peripheral devices is configured to relay received peripheral device information from other peripheral devices to the hub device and/or to at least one other peripheral device, such that all peripheral device information is eventually received at the hub device.

2. An asset management system comprising:
at least one hub device, the hub device including a wireless network interface and a short-range wireless communication interface; and
one or more peripheral devices, each peripheral device including a short-range wireless communication device in wireless communication with the hub device and/or at least one other of the peripheral devices;
wherein each of the one or more peripheral devices includes a peripheral device identifier and is configured to periodically broadcast peripheral device information including the peripheral device identifier to be received by the hub device;
wherein the hub device is configured to analyze received peripheral device information and transmit a report based on the analyzed peripheral device information to a remote station;
wherein each peripheral device is remotely configurable to specify the peripheral device identifier of the peripheral device and a time interval between periodic broadcasts of peripheral device information by the peripheral device;
wherein:
the hub device is positioned within a short-range wireless communication range of all of the one or more peripheral devices in a star-network topology; and
the hub device is configured to receive peripheral device information broadcasts directly from all of the peripheral devices.

3. The system of claim 2, wherein:
the at least one hub device includes multiple hub devices; and
one of the multiple hub devices is an intermediary hub device configured to receive a report from another one of the multiple hub devices and transmit the received report to the remote station.

4. The system of claim 1, wherein:
at least one of the one or more peripheral devices is coupled to at least one sensor to obtain data from the sensor; and
the peripheral device information broadcast by the at least one peripheral device includes the data obtained from the at least one sensor.

5. The system of claim 1, wherein:
the hub device further includes a global positioning system (GPS) receiver; and
the hub device is configured to obtain a location of the hub device from the GPS receiver and to include the location of the hub device in the report transmitted to the remote station.

6. The system of claim 1, wherein the hub device is configured to transmit a report to the remote station when:
received peripheral device information is indicative of an alert condition based on one or more stored peripheral device information trigger values; and/or
received peripheral device information is indicative of an absence of one or more of the peripheral devices.

7. The system of claim 1, wherein:
the hub device is configured to receive peripheral device information from only a subset of the one or more peripheral devices; and
the hub device is configured to transmit the report to the remote station based on analysis of only the peripheral device information received from the subset of the one or more peripheral devices.

8. The system of claim 1, wherein:
the short-range wireless communication interface of the hub device includes a BLUETOOTH short-range wireless communication interface; and
the short-range wireless communication device of each of the one or more peripheral devices includes a BLUETOOTH short-range wireless communication interface.

9. The system of claim 1, wherein each peripheral device is located with a different one of multiple stationary assets, to provide monitoring of the multiple stationary assets via the hub device.

10. The system of claim 1, wherein each peripheral device is located with a different one of multiple mobile assets, to provide monitoring of the multiple mobile assets via the hub device.

11. The system of claim 10, wherein each mobile asset includes a vehicle, and each peripheral device is positioned in or on its corresponding vehicle.

12. An asset management system comprising:
at least one hub device, the hub device including a wireless network interface and a short-range wireless communication interface; and
multiple peripheral devices connected in a mesh-network topology, each peripheral device including a short-range wireless communication device in wireless communication with the hub device and/or at least one other of the peripheral devices;
wherein each of the one or more peripheral devices includes a peripheral device identifier and is configured to periodically broadcast peripheral device information including the peripheral device identifier to be received by the hub device;
wherein the hub device is configured to analyze received peripheral device information and transmit a report based on the analyzed peripheral device information to a remote station; and
wherein each of the multiple peripheral devices is configured to relay received peripheral device information from other peripheral devices to the hub device and/or to at least one other peripheral device, such that all peripheral device information is eventually received at the hub device.

13. The system of claim 12, wherein:
each of the multiple peripheral devices is coupled to a different one of multiple sensors to obtain data from said sensor; and
the peripheral device information broadcast by each of the multiple peripheral devices includes the data obtained from its corresponding sensor.

14. The system of claim 12, wherein:
the hub device further includes a global positioning system (GPS) receiver; and
the hub device is configured to obtain a location of the hub device from the GPS receiver and to include the location of the hub device in the report transmitted to the remote station.

15. The system of claim 12, wherein the hub device is configured to transmit a report to the remote station when:
received peripheral device information is indicative of an alert condition based on one or more stored peripheral device information trigger values; and/or
received peripheral device information is indicative of an absence of one or more of the peripheral devices.

16. An asset management system comprising:
at least one hub device, the hub device including a wireless network interface and a short-range wireless communication interface; and
multiple peripheral devices, each peripheral device including a short-range wireless communication device in wireless communication with the hub device, the hub device positioned within a short-range wireless communication range of the multiple peripheral devices in a star-network topology, wherein:
each of the one or more peripheral devices includes a peripheral device identifier and is configured to periodically broadcast peripheral device information including the peripheral device identifier to be received by the hub device;
the hub device is configured to receive peripheral device information broadcasts directly from all of the peripheral devices and generate a report based on the analyzed peripheral device information; and
the hub device is configured to transmit the generated report to an intermediate hub device, the intermediate hub device configured to transmit the received report to a remote station.

17. The system of claim 16, wherein:
each of the multiple peripheral devices is coupled to a different one of multiple sensors to obtain data from said sensor; and
the peripheral device information broadcast by each of the multiple peripheral devices includes the data obtained from its corresponding sensor.

18. The system of claim 16, wherein:
the hub device further includes a global positioning system (GPS) receiver; and
the hub device is configured to obtain a location of the hub device from the GPS receiver and to include the location of the hub device in the report transmitted to the remote station.

19. The system of claim 16, wherein the hub device is configured to transmit a report to the remote station when:
received peripheral device information is indicative of an alert condition based on one or more stored peripheral device information trigger values; and/or
received peripheral device information is indicative of an absence of one or more of the peripheral devices.

* * * * *